US012639866B2

(12) United States Patent
Bhakthavatsalam et al.

(10) Patent No.: US 12,639,866 B2
(45) Date of Patent: May 26, 2026

(54) PIPELINE FOR GENERATING EDITABLE GRAPHIC DESIGNS FROM NATURAL LANGUAGE PROMPTS

(71) Applicant: Microsoft Technology Licensing, LLC, Redmond, WA (US)

(72) Inventors: Sumithra Bhakthavatsalam, Kirkland, WA (US); Gaurav Vinayak Tendolkar, Reston, VA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 273 days.

(21) Appl. No.: 18/484,512

(22) Filed: Oct. 11, 2023

(65) Prior Publication Data

US 2025/0124622 A1      Apr. 17, 2025

(51) Int. Cl.
| | |
|---|---|
| *G06T 11/60* | (2026.01) |
| *G06F 40/30* | (2020.01) |
| *G06F 40/40* | (2020.01) |
| *G06V 30/19* | (2022.01) |

(52) U.S. Cl.
CPC .............. *G06T 11/60* (2013.01); *G06F 40/30* (2020.01); *G06F 40/40* (2020.01); *G06V 30/19* (2022.01)

(58) Field of Classification Search
None
See application file for complete search history.

(56) References Cited

U.S. PATENT DOCUMENTS

| | | | |
|---|---|---|---|
| 2025/0111137 A1* | 4/2025 | Dumitrescu | .......... G06F 40/186 |
| 2025/0111139 A1* | 4/2025 | Mironica | .............. G06T 11/60 |

OTHER PUBLICATIONS

"Microsoft Designer", Retrieved from: https://designer.microsoft.com/, Retrieved Date: May 25, 2023, 03 Pages.

* cited by examiner

*Primary Examiner* — Nafiz E Hoque
(74) *Attorney, Agent, or Firm* — NovoTechIP International PLLC

(57) ABSTRACT

A device includes a processor, and a memory storing executable instructions which, when executed by the processor, cause the processor alone or in combination with other processors to perform the following functions: receive textual user input from a user describing a design to be generated; implement a first prompt generator to generate a first prompt for a Large Language Model (LLM) to restructure the user input; and implement a second prompt generator to generate a second prompt for a text-to-image model using output of the LLM to produce, the second prompt to prompt the text-to-image model to produce a proposed design based on the user input. The proposed design is provided to the user via an application comprising controls for further editing the proposed design.

18 Claims, 9 Drawing Sheets

Figure 1:
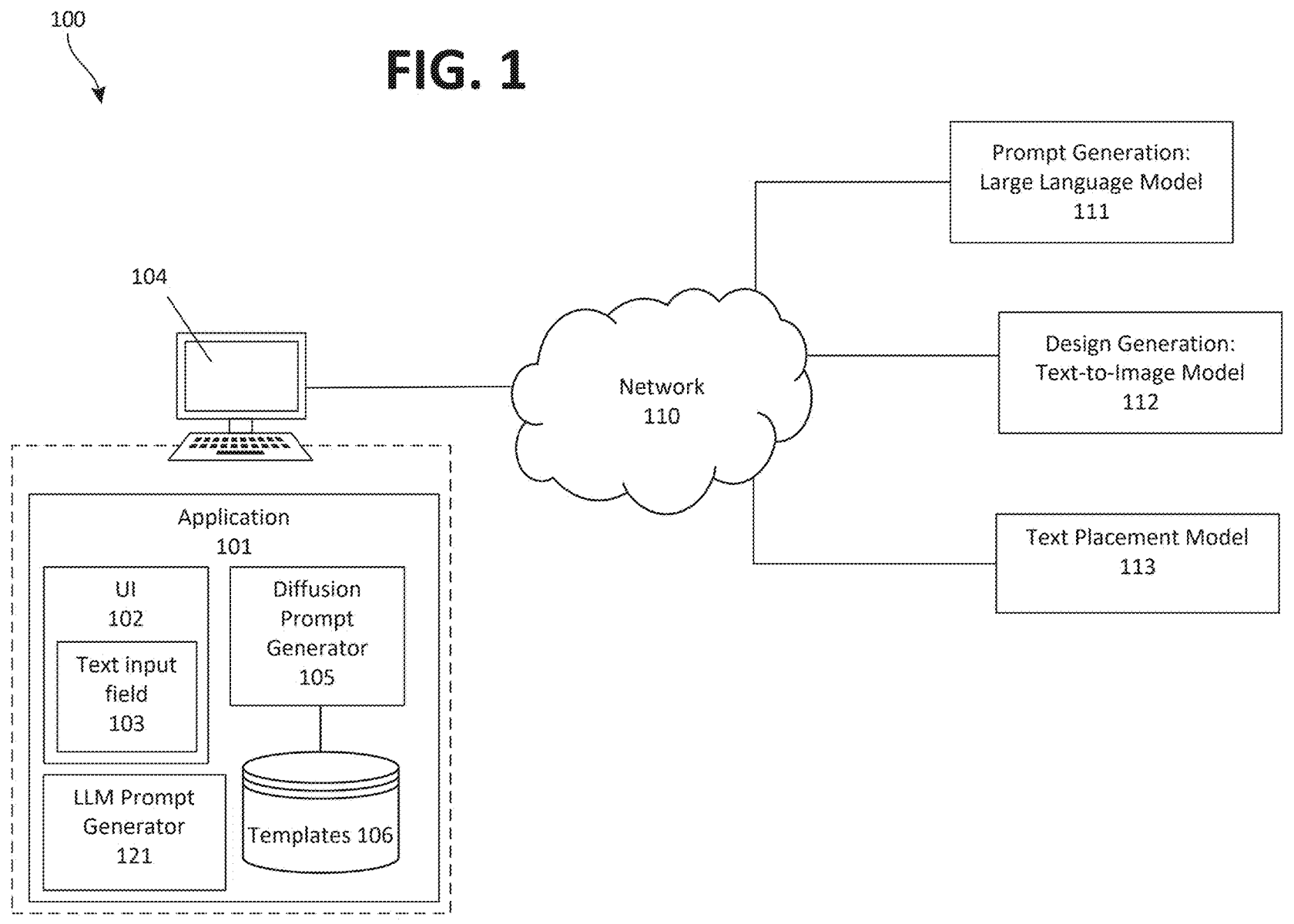

Prompt Generation:
Large Language Model
111

Design Generation:
Text-to-Image Model
112

Text Placement Model
113

Network
110

104

Application 101

UI
102

Text input
field
103

Diffusion
Prompt
Generator
105

Templates 106

LLM Prompt
Generator
121

FIG. 2

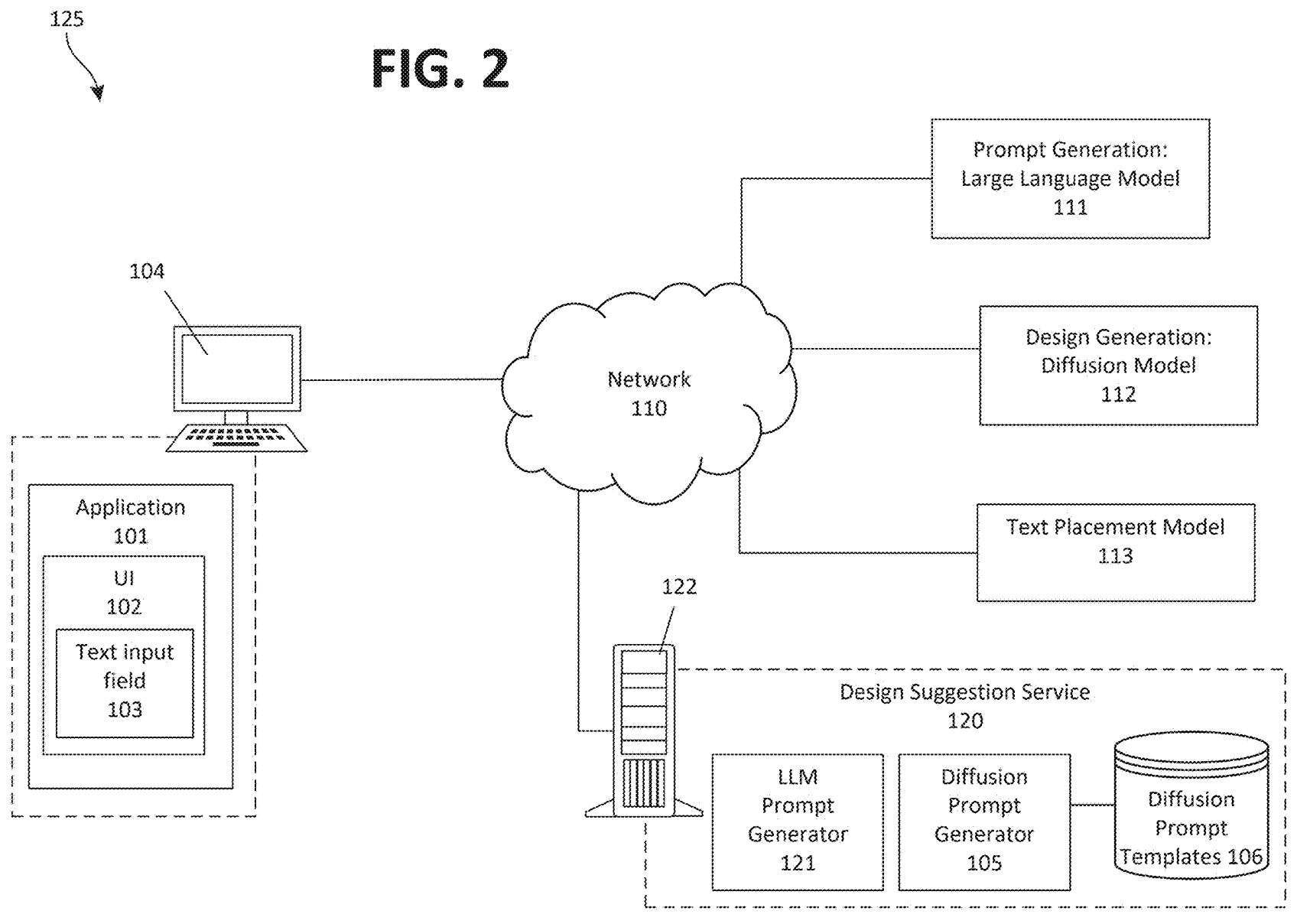

Prompt Generation: Large Language Model 111

Design Generation: Diffusion Model 112

Text Placement Model 113

Network 110

Design Suggestion Service 120

LLM Prompt Generator 121

Diffusion Prompt Generator 105

Diffusion Prompt Templates 106

122

Application 101

UI 102

Text input field 103

104

125

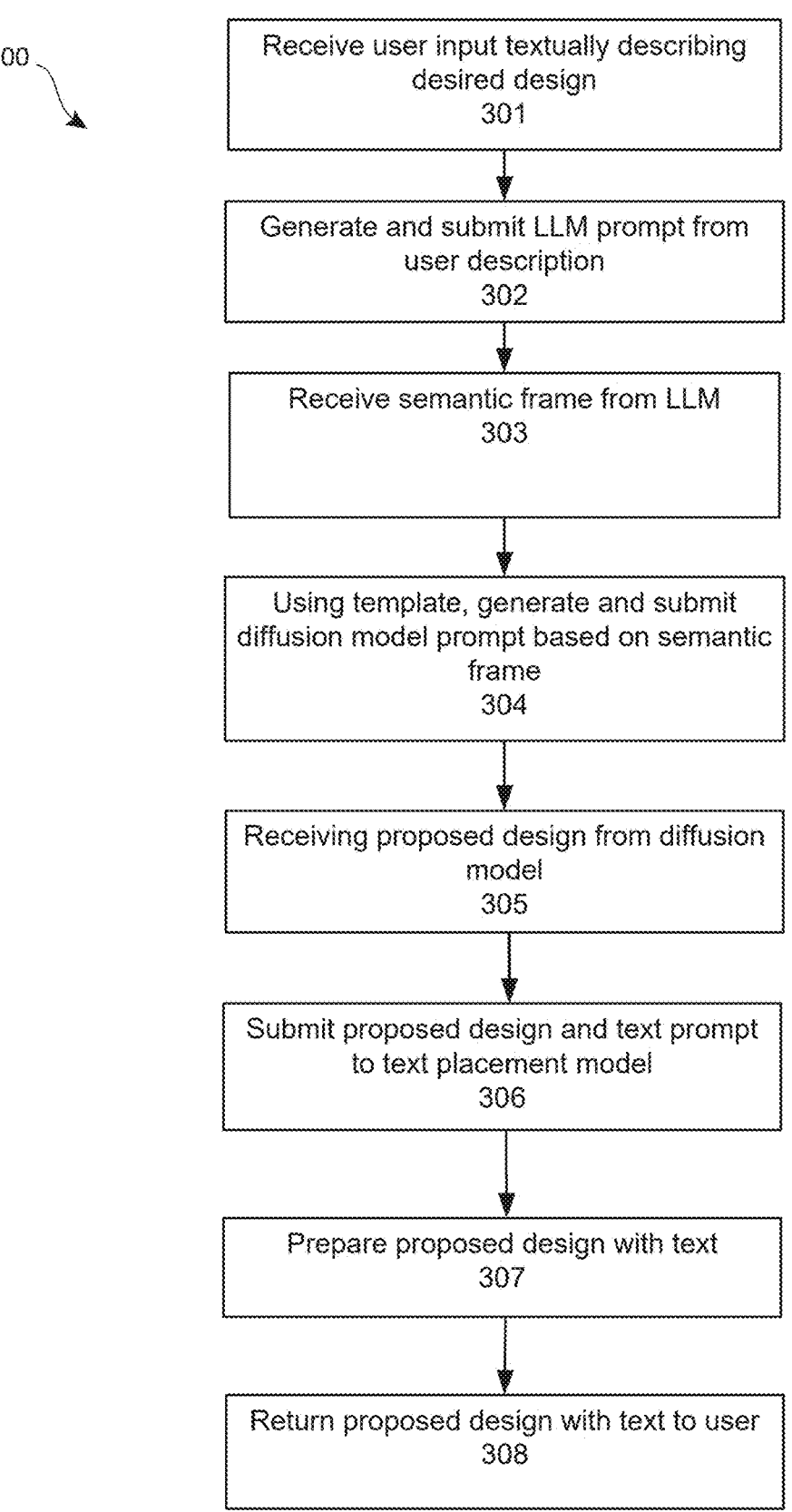

300

Receive user input textually describing desired design
301

Generate and submit LLM prompt from user description
302

Receive semantic frame from LLM
303

Using template, generate and submit diffusion model prompt based on semantic frame
304

Receiving proposed design from diffusion model
305

Submit proposed design and text prompt to text placement model
306

Prepare proposed design with text
307

Return proposed design with text to user
308

FIG. 4

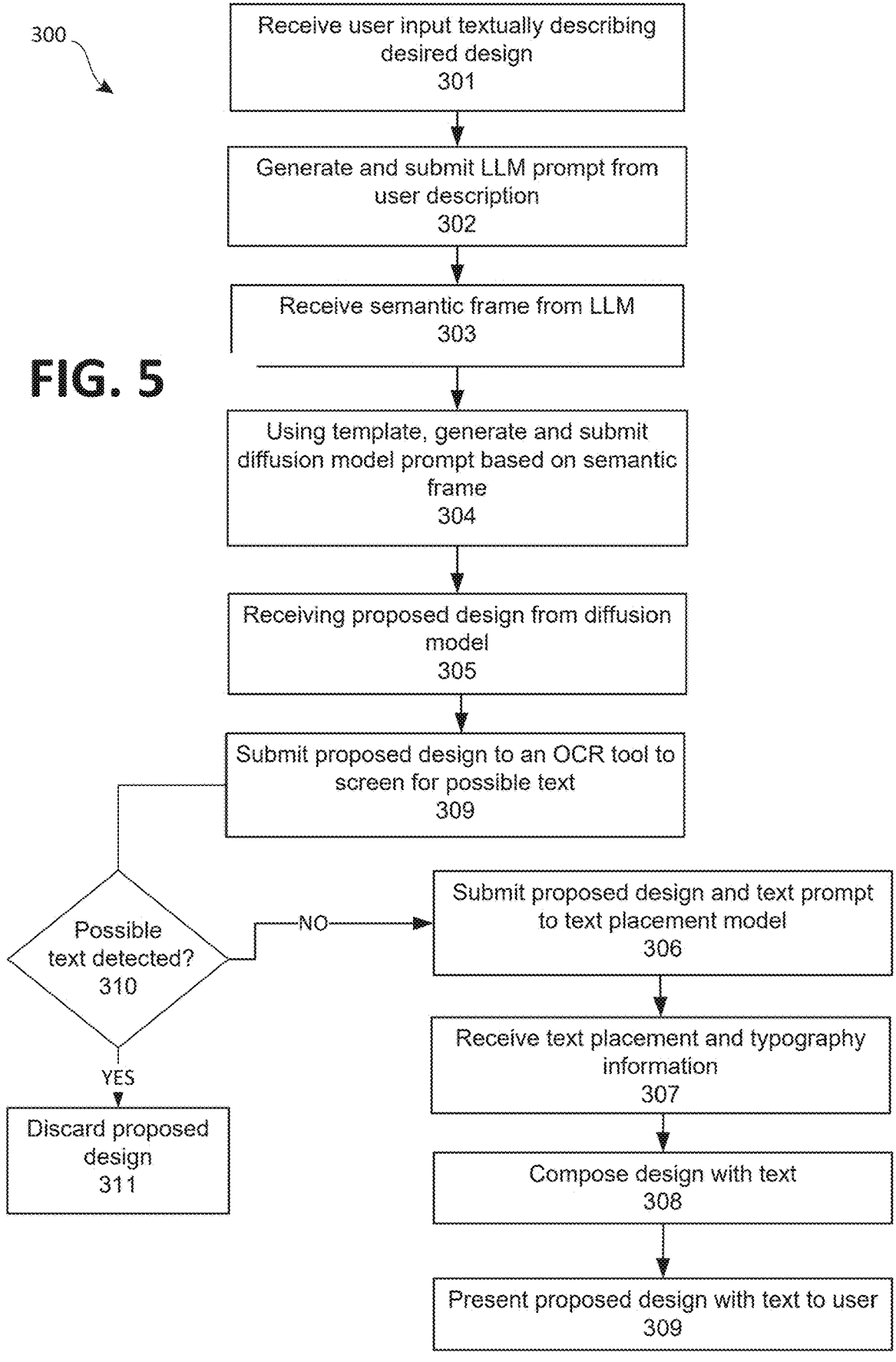

Receive user input textually describing desired design
301

Generate and submit LLM prompt from user description
302

Receive semantic frame from LLM
303

Using template, generate and submit diffusion model prompt based on semantic frame
304

Receiving proposed design from diffusion model
305

Submit proposed design to an OCR tool to screen for possible text
309

Possible text detected?
310

NO

Submit proposed design and text prompt to text placement model
306

YES

Discard proposed design
311

Receive text placement and typography information
307

Compose design with text
308

Present proposed design with text to user
309

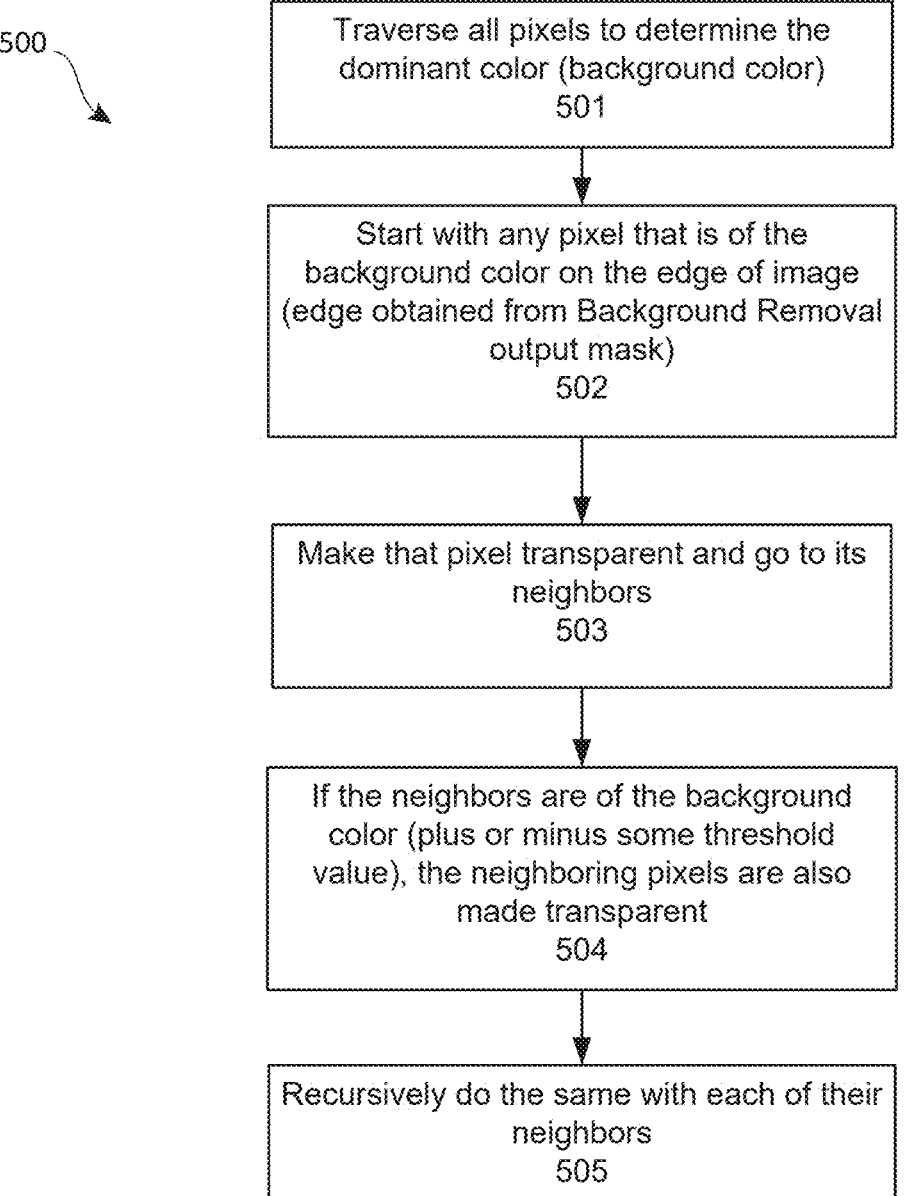

500

Traverse all pixels to determine the dominant color (background color)
501

Start with any pixel that is of the background color on the edge of image (edge obtained from Background Removal output mask)
502

Make that pixel transparent and go to its neighbors
503

If the neighbors are of the background color (plus or minus some threshold value), the neighboring pixels are also made transparent
504

Recursively do the same with each of their neighbors
505

FIG. 6

PIPELINE FOR GENERATING EDITABLE GRAPHIC DESIGNS FROM NATURAL LANGUAGE PROMPTS

BACKGROUND

Some productivity applications, including presentation and graphic design applications, include features that propose a design for a work that a user wants to create. For example, a presentation or slide deck application may take elements a user is adding to a slide and propose an overall design for the slide using those elements. The user is then able to edit the design to make adjustments based on their preferences or to add personalized content.

These application features typically make use of a library of templates. This library may include a smaller number of distinct templates, with each distinct template being supplemented by a number of variations on that design. These variants may change the size, color or other parameters of the elements from the parent design.

The application selects a template or several templates and, if available, fits user elements to each template. The user is then presented with the proposed design or design options. The user can select a preferred design and make further adjustments as preferred. The suggested designs are a function of all available assets, i.e., templates and other content, such as images or illustrations from the content library. For example, relevant images may be retrieved from an existing content library and swapped for images in the templates.

The ability of such design features to satisfy the preferences of a user is generally limited by the number of available templates. The more templates, particularly distinct templates, available, the more likely it is that the tool can present a design that fully satisfies the user. Thus, a technical problem in this field is the limited size of a template catalog available from which to present proposed designs to the user.

SUMMARY

In one general aspect, the instant disclosure presents a device includes a processor, and a memory storing executable instructions which, when executed by the processor, cause the processor alone or in combination with other processors to perform the following functions: receive textual user input from a user describing a design to be generated; implement a first prompt generator to generate a first prompt for a Large Language Model (LLM) to restructure the user input; and implement a second prompt generator to generate a second prompt for a text-to-image model using output of the LLM to produce, the second prompt to prompt the text-to-image model to produce a proposed design based on the user input. The proposed design is provided to the user via an application comprising controls for further editing the proposed design.

In another general aspect, a method of providing a design suggestion service based on user input includes: receiving textual user input from a user describing a design to be generated; implementing a first prompt generator to generate a first prompt for a Large Language Model (LLM) to restructure the user input; implementing a second prompt generator to generate a second prompt for a text-to-image model using output of the LLM to produce, the second prompt to prompt the text-to-image model to produce a proposed design based on the user input; and supporting user production of a desired work by providing the proposed design to a productivity application of the user, application comprising controls for further editing the proposed design.

In another general aspect, a device includes a processor, and a memory storing executable instructions which, when executed by the processor, cause the processor alone or in combination with other processors to perform the following functions: receive textual user input from a user describing a design to be generated; implement a first prompt generator to generate a first prompt for a Large Language Model (LLM) to restructure the user input; implement a second prompt generator to generate a second prompt for a text-to-image model using output of the LLM to produce, the second prompt to prompt the text-to-image model to produce a proposed design based on the user input; and submit the proposed design along with instructions derived from the user input to a text placement model to prompt the text placement model to provide a position for text to the proposed design. The proposed design with added text is provided to the user via an application comprising controls for further editing the proposed design.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIG. 1 depicts an example system in which aspects of this description are implemented.

FIG. 2 depicts an alternative example system in which aspects of this description are implemented.

FIG. 4 is a flow chart depicting a method or process according to principles described herein.

FIG. 5 is another flow chart depicting further details of a method or process according to principles described herein.

FIG. 6 is a flow chart depicting a technique for object layering according to principles described herein.

DETAILED DESCRIPTION

Figure 3A:
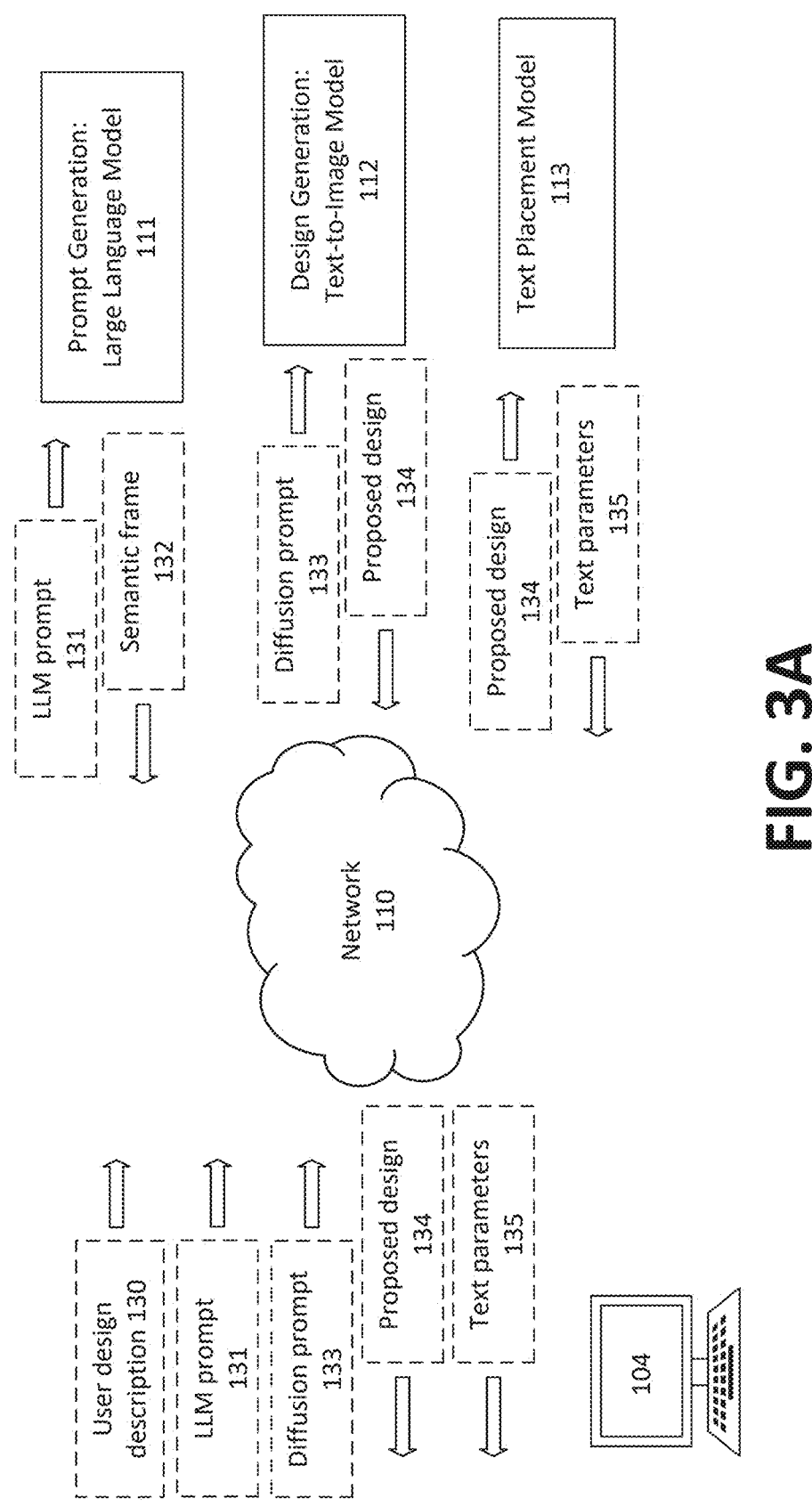
FIG. 3A depicts a workflow according to principles described herein.

As noted above, graphic design and other productivity applications may attempt to offer pleasing designs to a user in real-time as the user is creating a work. For example, the application may propose a design based on some user elements that have already been added to the workspace. Alternatively, the user could input a textual request describing the desired design or a query to search for a designed design. In any case, the application should then be able to provide a proposed design suiting the user's objective, query or description. To accomplish this goal, such applications need to be able to offer a variety of high quality, highly relevant design suggestions. These designs also should be editable design documents to let users make adjustments based on their preference and personalize content as they wish.

Some newer design applications may have tens of thousands of templates, of which several thousand are distinct. The remainder may be variants of the distinct templates. In comparison, older design applications that have been in use for a decade or more might have on the order of millions of templates. Again, the number of templates available is a technical problem that can limit the ability of the design application to present an impressive design to a user.

To address this technical problem, the following description will present a technical solution that leverages generative artificial intelligence (AI). Specifically, if the goal is to serve up effective designs for any valid request, regardless of the domain or topic, generative AI can be a powerful toolkit that will make the number of designs that can be generated virtually limitless and not a function of the size of the template or asset library.

In the context of more sophisticated design applications, the user may input a description of the design the user wants. The application will then utilize Natural Language Processing (NLP) and retrieval over a template and asset library to respond with a design suggestion or range of suggestions. However, the application may have limited template resources and not have a template that matches well to the user description. In other cases, the application may mishandle and fail to understand the intent of the user description, particularly if the request is brief and without sufficient detail or context. In either case, an appropriate design will not likely be suggested.

Thus, there are several technical challenges to creating designs from natural language prompts. One of the first such challenges is the Natural Language Understanding of the prompt. For quality outputs, the system needs to understand what imagery to generate for a given user request. Also, another obstacle is retrieving relevant content for the design. Specifically, the application may not have the coverage needed in its asset library. Additionally, translating visual and aesthetic requests from the user into a final design is programmatically challenging because of a lack of data and models for style retrieval and the sophistication needed to interpret some of the requests, for e.g., "fall colors." These phrases can be open-ended and maintaining a map of possible phrases to suitable color hex codes that also incorporates variety in the shades/hues is difficult to scale.

Text-to-image models can be used to fill the content gaps of an asset library as they have access to a large amount of information from their pretraining. They also have understanding of visual and aesthetic qualities like style and color. However, there are some challenges to leveraging them for design generation. Specifically, they can produce gibberish text. Moreover, they do not always produce design-like images. Additionally, graphic designs are generally characterized by elements such as shapes and decorators which set them apart from regular images. Text-to-image models on the other hand, are trained to produce regular images, often photo-realistic images. Thus, they produce an image, but a key requirement for a design suggestion is to produce the design as an editable document.

To address all of these technical problems and challenges, the following description provides a chain-of-models approach leveraging generative AI and other Deep Learning models.

FIG. 1 depicts an example system in which aspects of this description may be implemented. As shown in FIG. 1, the system 100 begins with a user terminal 104 where a user is operating an application 101. The terminal 104 can be any device that a user would employ to execute a productivity application, for example, a desktop, laptop or tablet computer or a thin client. The application 101 is a productivity application, specifically a graphic design or presentation application with which the user produces any number of different works. As described above, the application 101 may provide the user with assistance by way of a suggested design based on the work the user is trying to produce.

Consequently, the application 101 includes a user interface (UI) 102. This UI may have a text input field 103 that invites the user to describe the work the user wants to design. For example, the user may input the following description of the project to be produced: "An elegant post with pastel colors announcing our store's Valentine's Day collection of hand-made items."

As noted above, correctly interpreting this type of natural language user description of the desired design can be very challenging to achieve programmatically. Consequently, the application includes an LLM prompt generator 121.

A Large Language Model (LLM) is a type of artificial intelligence system designed to understand and generate human language. These models are built upon deep learning techniques and massive amounts of text data to process and generate natural language text. GPT (Generative Pre-trained Transformer) is a prominent example of an LLM. GPT is trained on an extensive corpus of text from the internet and other sources, enabling it to perform a wide range of natural language processing tasks. GPT can understand and generate human-like text, making it highly versatile. A GPT architecture, the Transformer, is particularly adept at capturing contextual information, allowing it to produce coherent and contextually relevant responses in a wide variety of applications, from chatbots and language translation to content generation and more.

Accordingly, the LLM prompt generator 121 structures a prompt for an LLM using the description provided by the user. In one example, this is a fixed prompt that specifies that the LLM is to understand the user input as a description for a design and that LLM is to extract values for each of a set of fields in a semantic frame from the user input. This prompt may then specify the fields for which a value is to be determined and that a field for which the user input does not provide a value is to be marked as not specified, or something similar. Alternatively, if the value for a particular field is not addressed in the user's description, the LLM prompt might specify a default value to be used for that field.

For example, the fields of the semantic frame could include Heading, Subheading, Design type, Visuals, Colors, Style, Image Count, Video Post and Animation Energy. This is just one example of the semantic frame. Other examples can include different fields or fields in a different order, with or without default values when user input does not address the field.

Given the example above, the user description is "An elegant post with pastel colors announcing our store's Valentine's Day collection of hand-made items." In such a case, the LLM prompt would incorporate this user description and could result in a response from the LLM or GPT model in the form of a specified semantic frame as follows:

Heading: "Valentine's Day Collection"

Subheading: "Show your love with special hand-made gifts"

Design type: Post

Visuals: Valentine's Day Collection

Colors: Pastel

Style: Elegant

Image Count: 1

Video Post: No

Animation Energy Level: Low

In this example, the Image Count value of "1" may be the specified default value unless overridden by something in the user's description.

Additional examples of a user description and corresponding LLM output are as follows:

User Input: "An Instagram Post to advertise athletic gear with a video of a runner on a field"

This user input is then incorporated into a prompt to the LLM. The prompt to the LLM requests output in the form of a semantic frame, which might be as follows:

LLM/GPT Output:

Heading: "Great athletic gear!"

Subheading: "Come shop with us"

Design type: Instagram Post

Visuals: Runner on a field

Colors: Not Specified

Style: Not Specified

Image Count: 1

Video Post: Yes

Animation Energy: Not Specified

User Input: "A birthday card for my dad with two images of puppies"

This user input is then incorporated into a prompt to the LLM. The prompt to the LLM requests output in the form of a semantic frame, which might be as follows:

LLM/GPT Output:

Heading: "Happy Birthday, Dad!"

Subheading: Not Specified

Design type: Card

Visuals: Puppies

Colors: Not Specified

Style: Not Specified

Image Count: 2

Video Post: No

Animation Energy: Not Specified

After the LLM prompt generator 121 generates the LLM prompt from the user input, the LLM prompt is submitted to an LLM 111. As shown in FIG. 1, this may be done via a network interface of the terminal 104 where a network 110 provides communication between the terminal 104 and the LLM 111.

After the application 101 receives back the completed semantic frame from the LLM 111, as described above, the semantic frame is used by a diffusion prompt generator 105 to produce a prompt for a text-to-image or diffusion model 112.

A text-to-image model is an artificial intelligence system that takes textual descriptions as input and generates corresponding images as output. One noteworthy example of such a model is the diffusion model. The diffusion model operates by iteratively improving a random noise image to align it with the given text description. It utilizes a series of diffusion steps, where noise is added and progressively removed to refine the image. This process allows the model to capture intricate details and nuances specified in the text, gradually transforming a random image into a coherent representation of the described scene. The diffusion model excels at producing high-quality, realistic images based on text prompts and has found applications in various domains, including art generation, design, and visual content creation. Its ability to bridge the gap between language and visual content holds great potential for enhancing the creative and practical aspects of AI-driven image generation. An example of a diffusion model that could be used as described herein is DALL-E by OpenAI. Another is Stable Diffusion by Stable Diffusion. Other text-to-image models, apart from diffusion models, exist and could be used in the systems and method described herein. However, for ease of reference, the term "diffusion model" will be used to refer generically to all text-to-image models.

The diffusion prompt generator 105 of the application 101 will use the semantic frame produced by the LLM 111 from the user description as its input. The diffusion prompt generator 105 will also have a number of templates in a database 106 to use for constructing a prompt to a diffusion model 112. For example, a template may include variables or fields within its instructions that are to be completed with values from the semantic frame returned from the LLM.

Examples of such templates could include:

a. small vector illustration of #VISUALS on solid background, #COLORS color, #STYLE style b. simple, contemporary illustration of #IVISUALS in calm colors on solid background with empty space c. sparse pattern of #VISUALS, whimsical mid-century modern style, leave large blank space in the center for text In each such template, the diffusion prompt generator 105 will populate values for, for example, #VISUALS, #COLORS and #STYLE based on those fields values in the corresponding semantic frame provided by the LLM with the following logic:

For every Prompt Template:

i. Replace #VISUALS in Prompt Template with Visuals from GPT Sematic Frame ii. If Style from GPT Semantic Frame is not 'Not Specified':

Replace '#STYLE' with Style else:

Remove '#STYLE style' from the Prompt Template iii. If Colors from GPT Semantic Frame is not 'Not Specified':

Replace '#COLORS with Colors else:

Remove '#COLORS color' from the Prompt Template

These prompt templates may be chosen to avoid text generation so that only a graphic design or image is returned. This may be done based on offline experiments. The prompt template used at this stage may be chosen randomly from the available templates. This may be random selection or based on some logic or model to choose a contextually good prompt template from the prompt template bank. For example, usage patterns of input design requests (text) from the user along with prompt templates that resulted in high Kept Rates of the designs, can be used to train a model to select a number of prompt templates. There is not limit on the number of prompt templates selected to serve a single request. It could be a one template, a number of templates or all the available templated if the user was to sample greater variety.

The resulting prompt built from the templates 106, using the semantic frame from the LLM model 111 is then submitted to the diffusion model 112. The diffusion model 112 then returns a graphic design matched to the description entered by the user as interpreted by the LLM via the semantic frame and diffusion model template prompts.

Lastly, the design output by the diffusion model 112 is used by the application 101 in a prompt to a text placement model 113. The text placement model 113 is a machine learning model that has been trained on a corpus of designs that incorporate text with images. This training set consists of designs that have been prepared by human designers with an eye for selecting aesthetically a font, size, style, placement, etc. for text that accompanies an image or images.

Machine learning is a subfield of artificial intelligence that involves training algorithms to learn from data and make predictions or decisions without being explicitly programmed. Central to the concept of machine learning is the notion of a training set. A training set is a portion of a larger dataset that is used to teach a machine learning model. It consists of input data (features) and corresponding output labels or target values. The model learns patterns, relationships, and rules from this training data, adjusting its internal parameters to minimize the difference between its predictions and the actual target values. In essence, the training set serves as a teacher, allowing the model to generalize from the examples it has seen and apply its learned knowledge to make predictions or decisions on new, unseen data. The quality and size of the training set significantly impacts the performance and generalization ability of a machine learning model, making it a critical component in the development of effective and accurate machine learning systems.

In one particular example, the text placement model 113 may be produced by training the object segmentation model YOLOv6 using a catalog of designs or design templates. To improve the performance of the object segmentation model, variations of existing designs in the training set can be created by randomly swapping out images or the colors of various elements. This technique of augmenting the training set improves the object segmentation performance of the trained model.

A pre-training step can also improve the effectiveness of the model in learning text placement. In this technique, a large synthetic dataset of design images is created by randomly placing rectangles on the images of a design catalog. The model is then trained or learns to predict the coordinates of the rectangles. This helps the model learn visual properties of the image and predict geometric attributes. Then, the model can be finetuned on the same dataset for text placement prediction.

Consequently, the text placement model 113, trained as explained above, receives as a prompt the proposed design from the diffusion model 112 and an indication of text to include. This text might come from the user input, such as the heading or subheading from the semantic frame. Alternatively, the text placement model could include LLM or GPT functionality or could use an LLM or GPT model and produce new text based on the text of the user input. In either case, the text placement model 113 then determines the appearance and placement of the text relative to the design from the diffusion model. Based on the training of the text placement model 113, this text will have an aesthetically pleasing arrangement with the graphic design from the diffusion model. This, then, completes a suggested design responsive to the description input by the user.

For example, a prompt for the text placement model 113 can be prepared using the DALL-E generated image as the canvas background with the text (Heading) returned in the LLM's output semantic frame placed. The result is based on a position of the text determined by the text placement model 113. Currently for font choice, the text placement model 113 includes a font recommendation model that accounts for the style returned by LLM and selects an appropriate font for the style.

The suggested design, including images and text, is then returned to the user terminal 104. The user will then be able to accept or reject the design. If the user is not satisfied, the user may input an updated description of the design and have the system 100 iterate the workflow described above to produce a new suggestion. In some examples, the system 100 may automatically iterate the workflow to produce multiple suggested designs that are returned and from which the user can select a preference. The user can also take a suggested design and edit it using the tools of the application 101. Specifically, once the user has accepted a proposed design, the user can further invoke the editing tools of the application 101 and UI 102. This will take the user to a Canvas Editing experience where the user can edit any aspect of the design, such as the text content, the placement of text, the font, color and the like.

In various examples, when the user is satisfied with the design, they can choose to either download or publish the design. This means that the design was kept. This information along with all the edits the user performed on the canvas are then used to improve the solution over time, including: quality of the text placement model results, quality of the font recommendation model results, and choice of prompt templates used for DALL-E based on telemetry on the most popular ones (those that result in high keep rates). The process of improving the solution may involve finetuning the models using feedback from the results.

FIG. 2 depicts an alternative example system in which aspects of this description are implemented. As shown in FIG. 2, the LLM prompt generator 121, the diffusion prompt generator 105 and the database of templates 106 can be incorporated into a design suggestion service 120. This service 120 is hosted on a server 122. Consequently, the application 101 on the terminal 104 does not incorporate all these components. Rather, the application 101 calls the design suggestion service 120 when the user inputs a textual description of a desired design in the UI 102. The service 120 then executes the same workflow described above in order to produce a proposed design for the user that is then returned by the service 120 to the application 101 at the user terminal 104. In an alternative implementation, the application 101 itself is an online application which is accessed by the terminal 104 via a user agent such as a web browser.

FIG. 3A depicts a workflow according to principles described herein. In particular, the workflow of FIG. 3A could be implemented by the system in either FIG. 1 or FIG. 2.

As shown in FIG. 3A and as described above, the user terminal 104 receives input that defines a user's description 130 of a desired design. This description 130 is incorporated into an LLM prompt 131, either by an application on the terminal 104 or an external service. The LLM prompt 131 is submitted to the LLM 111, which returns, in response, the semantic frame 132 described above.

The semantic frame 132 is used to produce a diffusion model prompt 133. As described above, this may be accomplished by using the data of the semantic frame to populate the fields of a template for the diffusion prompt 133. Again, this can be done either by an application on the terminal 104 or an external service. The diffusion prompt 133 is then submitted to the diffusion or other text-to-image model 112.

The diffusion model 112 then outputs a proposed design 134. Typically, this proposed design will not include text.

Consequently, the proposed design 134 is the submitted to a multimodal text placement model 113 along with a prompt to add appropriate text based, for example, on the original user design description 130. The text placement model 113 returns coordinate positions for a bounding box for where text should be placed. The text placement model 133 may also, in some examples, return other information for typography (e.g., fonts, colors etc.). The application 101 or the design suggestion service 120 receives this information and composes the final design by placing the text with the appropriate attributes in the designated location on the design image. The text placement model 113 may indicate all the parameters of the added text including font, size, color, location, etc. These text parameters 135 are then provided to the user terminal 104 where the application 101 will add the text to the proposed design and present the result to the user. The user then can review, accept/reject or further edit the design with text.

Figure 3B:
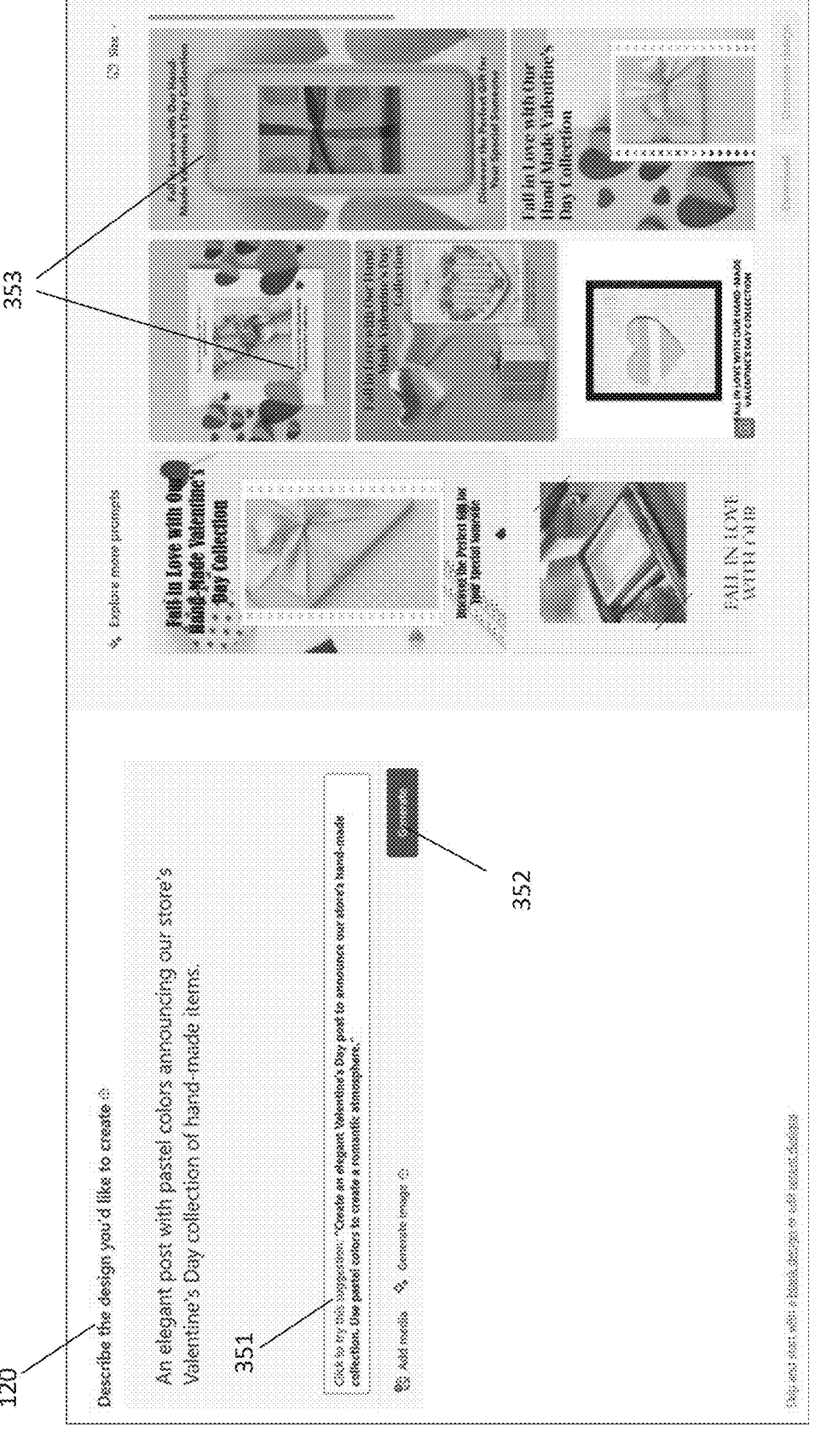
FIG. 3B depicts a user interface according to principles described herein.

FIG. 3B is an example of the user interface (UI) 120 illustrated also in FIGS. 1 and 2. As shown in FIG. 3B, the UI 120 may include a text field 351 where the user is prompted to enter a textual description of the design or work being created. A button 352 is then actuated to perform the process described herein. The resulting proposed designs 353, based on the user's input, are then displayed in the UI for the user. The user can select a design and, if desired, may further edits.

FIG. 4 is a flow chart depicting a method or process according to principles described herein. As shown in FIG. 4, the method begins with receiving the user input textually describing the desired design 301. As described above, this is typically done with a user interface having a text field that prompts the user to describe the design or work that the user wants to create.

Next, the method generates and submits an LLM prompt from the user description 302. This prompt can specify the details of a semantic frame to be populated with values derived from the user's description. In response, the semantic frame, as described above, is received from the LLM 303.

Next, the values organized in the semantic frame are used with a template to generate a diffusion model prompt 304. This prompt is submitted to a diffusion or other text-to-image model to produce a design, including graphics and/or images, based on the prompt which, in turn, is based on the user's desired design description.

After the resulting proposed design is received from the diffusion model 305, that design is submitted 306 to a text placement model along with instructions for adding text to the design. The text placement model, as described above, is multimodal and trained with a training set of aesthetically pleasing designs that incorporate both text and graphic elements. Together the proposed design and instructions for adding text to the design are referred to as a design and text prompt.

The text placement model will, in response, output coordinate positions for a bounding box for where text should be placed along with potentially other information for typography (fonts, colors etc.). These text parameters are received 307 by the entity that called the text placement model. The design with text is prepared 308 and then presented 309 for consideration by the user. The user may accept or reject the design with text. The user may request that the process be reiterated to produce a new design with text. The user may also further edit the proposed design with text. In some examples, the method will, in parallel, produce multiple examples of the design with text from which the user can choose a preference.

FIG. 5 is another flow chart depicting further details of a method or process according to principles described herein. The method in FIG. 5 is similar to that of FIG. 4 with the following addition.

In one example, the text-to-image model used is DALL-E 2.5. As noted above, however, any diffusion or text-to-image model can potentially be used. For example, Stable Diffusion can also be used with fine-tuning of the model to control for text generation. The output quality of the model can also be controlled to produce design-like images rather than photorealistic images.

In either case, with careful prompt engineering, it is possible to reliably get design outputs that do not contain text so as not to interfere with the later operation of the text placement model 113. As a safeguard, an Optical Character Recognition (OCR) tool can be used to identify and filter out outputs that might contain text.

As shown in FIG. 5, after receiving a proposed design from the diffusion model 305, the proposed design is submitted to an OCR tool to screen for possible text 309. The OCR tool will determine whether there is any potential text in the proposed design. If text is detected 310, the design can be discarded 311. In this event, the process can return to 304 and resubmit a prompt to the diffusion model to obtain another proposed design.

FIG. 6 is a flow chart depicting a technique for object layering according to principles described herein. For simplicity, the description above explains the generation of designs with a relatively simple structure of a background image with text on top. However, designs may also be produced with a more sophisticated structure involving additional layering. For example, after a design has been produced that includes both a background image and text, a layered design can be created by removing the background and then using a connected components algorithm for edge refinement. The connected component algorithm 500 may begin by traversing all pixels to determine the dominant color (background color) 501. Then, the algorithm 500 starts with any pixel that is of the background color on the edge of the image 502 and makes that pixel transparent before going to its neighbors 503. The edge is obtained from a background removal output mask. If the neighbors are of the background color (plus or minus some threshold value), they are also made transparent 504. This process is recursively repeated with each of the pixel's neighbors 505.

As a result, different objects in the original background image can be separated into different layers of the design. The user can then select, move, delete, reposition or otherwise manipulate the different elements from within what was a unitary background image.

Similarly, to offer the user an editable design document, an object segmentation model can be used to infer bounding boxes for all of the key elements in the design. This can then allow the user to customize these elements, including replacing them with other elements, on the canvas. An important aspect of this is to allow the user to personalize a design by inserting their own images into the design. Specifically, users can upload their own images for use in the design.

For example, an Object Segmentation model such as YOLOv6 is used to determine bounding boxes for the elements in an image. In a process similar to that described above for the text placement model 113, this model can be jointly trained to identify both text and image bounding boxes.

Figure 7:
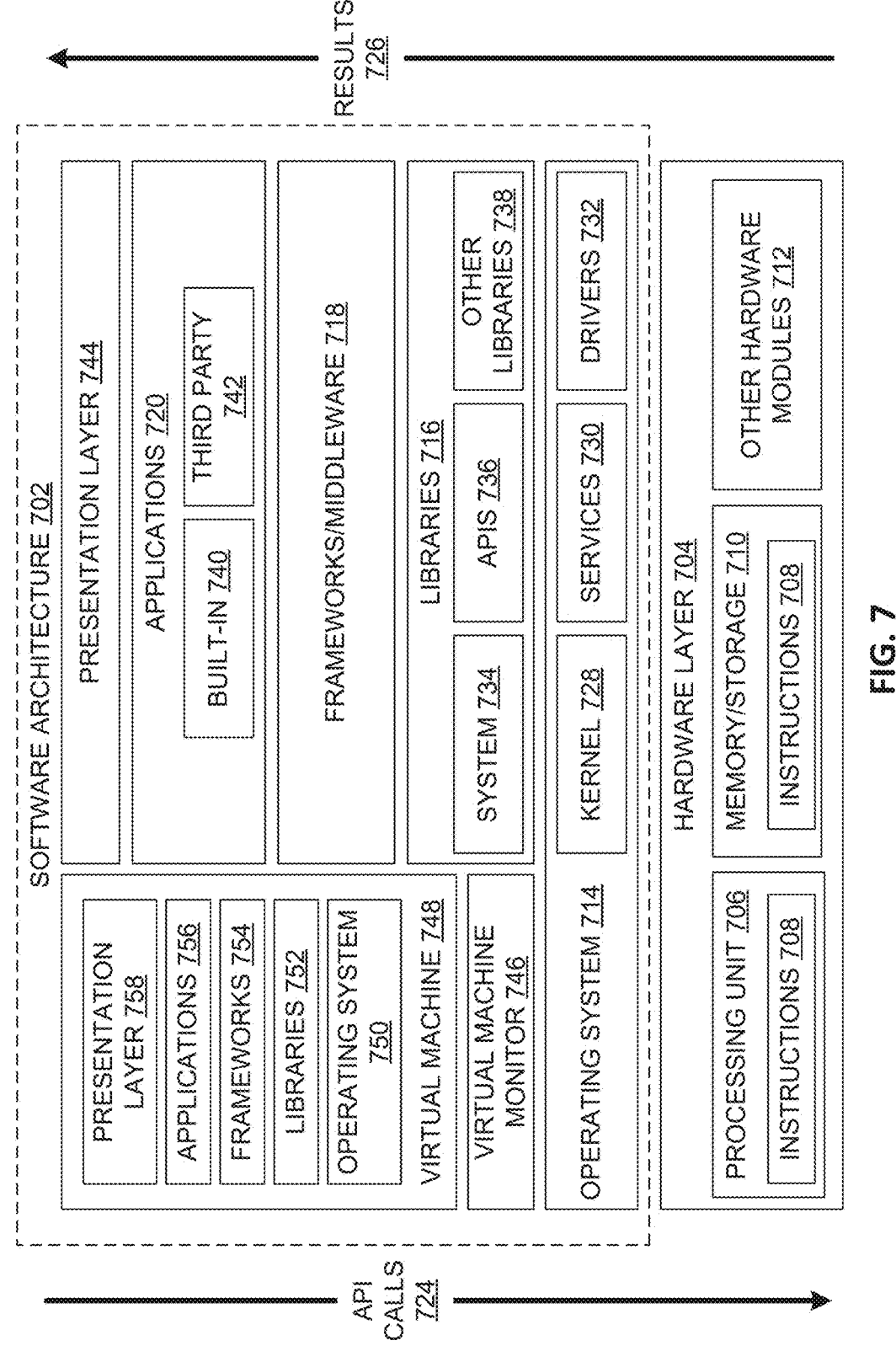
FIG. 7 is a block diagram illustrating an example software architecture, various portions of which may be used in conjunction with various hardware architectures herein described.

FIG. 7 is a block diagram 700 illustrating an example software architecture 702, various portions of which may be used in conjunction with various hardware architectures herein described, which may implement any of the above-described features. FIG. 7 is a non-limiting example of a software architecture, and it will be appreciated that many other architectures may be implemented to facilitate the functionality described herein. The software architecture 702 may execute on hardware such as a machine 800 of FIG. 8 that includes, among other things, processors 810, memory 830, and input/output (I/O) components 850. A representative hardware layer 704 is illustrated and can represent, for example, the machine 800 of FIG. 8. The representative hardware layer 704 includes a processing unit 706 and associated executable instructions 708. The executable instructions 708 represent executable instructions of the software architecture 702, including implementation of the methods, modules and so forth described herein. The hardware layer 704 also includes a memory/storage 710, which also includes the executable instructions 708 and accompanying data. The hardware layer 704 may also include other hardware modules 712. Instructions 708 held by processing unit 706 may be portions of instructions 708 held by the memory/storage 710.

The example software architecture 702 may be conceptualized as layers, each providing various functionality. For example, the software architecture 702 may include layers and components such as an operating system (OS) 714, libraries 716, frameworks 718, applications 720, and a presentation layer 744. Operationally, the applications 720 and/or other components within the layers may invoke API calls 724 to other layers and receive corresponding results 726. The layers illustrated are representative in nature and other software architectures may include additional or different layers. For example, some mobile or special purpose operating systems may not provide the frameworks/middleware 718.

The OS 714 may manage hardware resources and provide common services. The OS 714 may include, for example, a kernel 728, services 730, and drivers 732. The kernel 728 may act as an abstraction layer between the hardware layer 704 and other software layers. For example, the kernel 728 may be responsible for memory management, processor management (for example, scheduling), component management, networking, security settings, and so on. The services 730 may provide other common services for the other software layers. The drivers 732 may be responsible for controlling or interfacing with the underlying hardware layer 704. For instance, the drivers 732 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 716 may provide a common infrastructure that may be used by the applications 720 and/or other components and/or layers. The libraries 716 typically provide functionality for use by other software modules to perform tasks, rather than rather than interacting directly with the OS 714. The libraries 716 may include system libraries 734 (for example, C standard library) that may provide functions such as memory allocation, string manipulation, file operations. In addition, the libraries 716 may include API libraries 736 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 716 may also include a wide variety of other libraries 738 to provide many functions for applications 720 and other software modules.

The frameworks 718 (also sometimes referred to as middleware) provide a higher-level common infrastructure that may be used by the applications 720 and/or other software modules. For example, the frameworks 718 may provide various graphic user interface (GUI) functions, high-level resource management, or high-level location services. The frameworks 718 may provide a broad spectrum of other APIs for applications 720 and/or other software modules.

The applications 720 include built-in applications 740 and/or third-party applications 742. Examples of built-in applications 740 may include, but are not limited to, a contacts application, a browser application, a location application, a media application, a messaging application, and/or a game application. Third-party applications 742 may include any applications developed by an entity other than the vendor of the particular platform. The applications 720 may use functions available via OS 714, libraries 716, frameworks 718, and presentation layer 744 to create user interfaces to interact with users.

Some software architectures use virtual machines, as illustrated by a virtual machine 748. The virtual machine 748 provides an execution environment where applications/modules can execute as if they were executing on a hardware machine (such as the machine 800 of FIG. 8, for example). The virtual machine 748 may be hosted by a host OS (for example, OS 714) or hypervisor, and may have a virtual machine monitor 746 which manages operation of the virtual machine 748 and interoperation with the host operating system. A software architecture, which may be different from software architecture 702 outside of the virtual machine, executes within the virtual machine 748 such as an OS 750, libraries 752, frameworks 754, applications 756, and/or a presentation layer 758.

Figure 8:
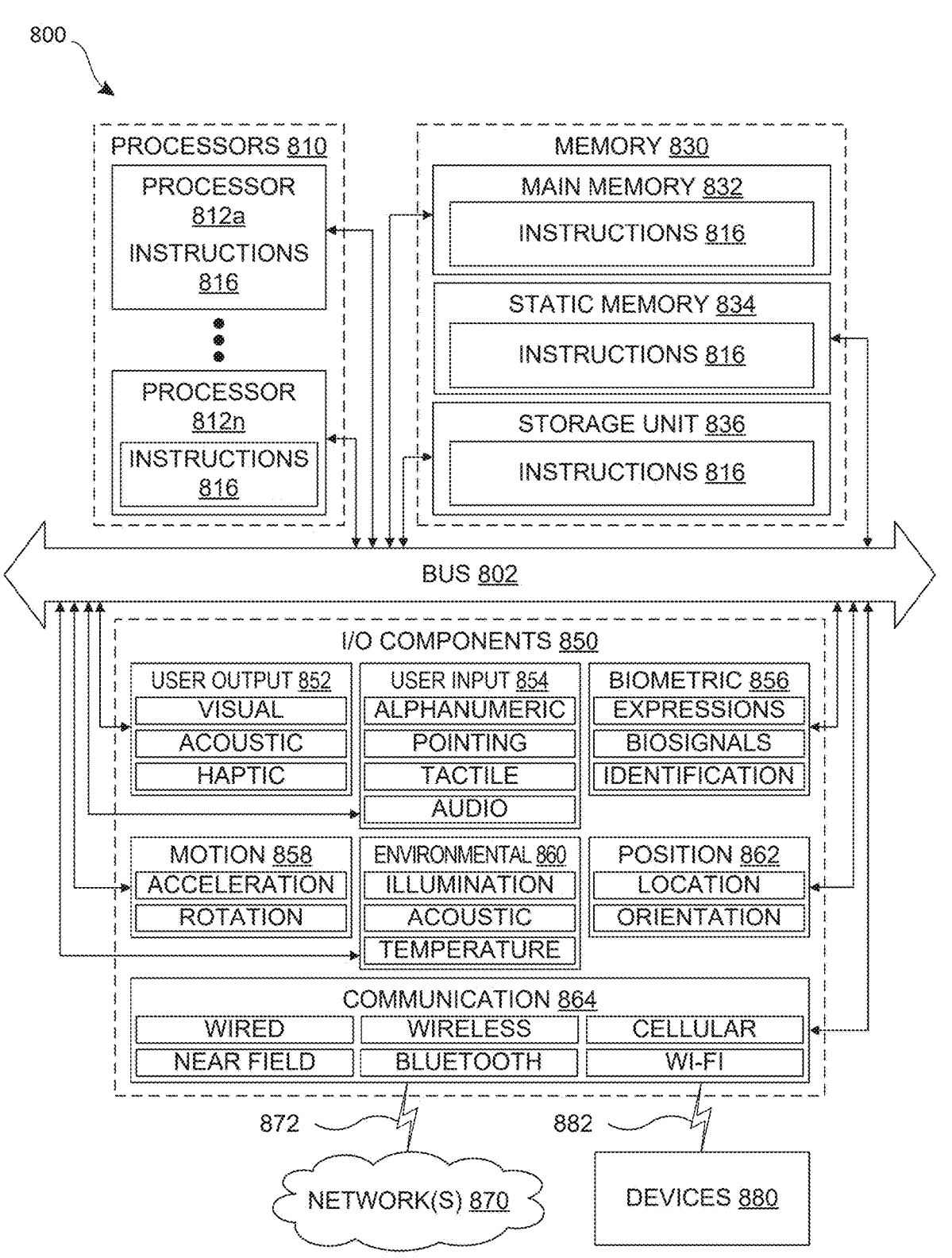
FIG. 8 is a block diagram illustrating components of an example machine configured to read instructions from a machine-readable medium and perform any of the features described herein.

FIG. 8 is a block diagram illustrating components of an example machine 800 configured to read instructions from a machine-readable medium (for example, a machine-readable storage medium) and perform any of the features described herein. The machine 800 could be used as the user terminal 104 or the server 122 described above. The example machine 800 is in the form of a computer system, within which instructions 816 (for example, in the form of software components) for causing the machine 800 to perform any of the features described herein may be executed.

As such, the instructions 816 may be used to implement modules or components described herein. The instructions 816 cause unprogrammed and/or unconfigured machine 800 to operate as a particular machine configured to carry out the described features. The machine 800 may be configured to operate as a standalone device or may be coupled (for example, networked) to other machines. In a networked deployment, the machine 800 may operate in the capacity of a server machine or a client machine in a server-client network environment, or as a node in a peer-to-peer or distributed network environment. Machine 800 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 800 is illustrated, the term "machine" includes a collection of machines that individually or jointly execute the instructions 816.

The machine 800 may include processors 810, memory 830, and I/O components 850, which may be communicatively coupled via, for example, a bus 802. The bus 802 may include multiple buses coupling various elements of machine 800 via various bus technologies and protocols. In an example, the processors 810 (including, for example, a central processing unit (CPU), a graphics processing unit (GPU), a digital signal processor (DSP), an ASIC, or a suitable combination thereof) may include one or more processors 812a to 812n that may execute the instructions 816 and process data. In some examples, one or more processors 810 may execute instructions provided or identified by one or more other processors 810. The term "processor" includes a multi-core processor including cores that may execute instructions contemporaneously. Although FIG. 8 shows multiple processors, the machine 800 may include a single processor with a single core, a single processor with multiple cores (for example, a multi-core processor), multiple processors each with a single core, multiple processors each with multiple cores, or any combination thereof. In some examples, the machine 800 may include multiple processors distributed among multiple machines.

The memory/storage 830 may include a main memory 832, a static memory 834, or other memory, and a storage unit 836, both accessible to the processors 810 such as via the bus 802. The storage unit 836 and memory 832, 834 store instructions 816 embodying any one or more of the functions described herein. The memory/storage 830 may also store temporary, intermediate, and/or long-term data for processors 810. The instructions 816 may also reside, completely or partially, within the memory 832, 834, within the storage unit 836, within at least one of the processors 810 (for example, within a command buffer or cache memory), within memory at least one of I/O components 850, or any suitable combination thereof, during execution thereof. Accordingly, the memory 832, 834, the storage unit 836, memory in processors 810, and memory in I/O components 850 are examples of machine-readable media.

As used herein, "machine-readable medium" refers to a device able to temporarily or permanently store instructions and data that cause machine 800 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 816) for execution by a machine 800 such that the instructions, when executed by one or more processors 810 of the machine 800, cause the machine 800 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 850 may include a wide variety of hardware components adapted to receive input, provide output, produce output, transmit information, exchange information, capture measurements, and so on. The specific I/O components 850 included in a particular machine will depend on the type and/or function of the machine. For example, mobile devices such as mobile phones may include a touch input device, whereas a headless server or IoT device may not include such a touch input device. The particular examples of I/O components illustrated in FIG. 8 are in no way limiting, and other types of components may be included in machine 800. The grouping of I/O components 850 are merely for simplifying this discussion, and the grouping is in no way limiting. In various examples, the I/O components 850 may include user output components 852 and user input components 854. User output components 852 may include, for example, display components for displaying information (for example, a liquid crystal display (LCD) or a projector), acoustic components (for example, speakers), haptic components (for example, a vibratory motor or force-feedback device), and/or other signal generators. User input components 854 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 850 may include biometric components 856, motion components 858, environmental components 860, and/or position components 862, among a wide array of other physical sensor components. The biometric components 856 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 858 may include, for example, acceleration sensors (for example, an accelerometer) and rotation sensors (for example, a gyroscope). The environmental components 860 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 862 may include, for example, location sensors (for example, a Global Position System (GPS) receiver), altitude sensors (for example, an air pressure sensor from which altitude may be derived), and/or orientation sensors (for example, magnetometers).

The I/O components 850 may include communication components 864, implementing a wide variety of technologies operable to couple the machine 800 to network(s) 870 and/or device(s) 880 via respective communicative couplings 872 and 882. The communication components 864 may include one or more network interface components or other suitable devices to interface with the network(s) 870. The communication components 864 may include, for example, components adapted to provide wired communication, wireless communication, cellular communication, Near Field Communication (NFC), Bluetooth communication, Wi-Fi, and/or communication via other modalities. The device(s) 880 may include other machines or various peripheral devices (for example, coupled via USB).

In some examples, the communication components 864 may detect identifiers or include components adapted to detect identifiers. For example, the communication components 864 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 864, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

Generally, functions described herein (for example, the features illustrated in FIGS. 1-6) can be implemented using software, firmware, hardware (for example, fixed logic, finite state machines, and/or other circuits), or a combination of these implementations. In the case of a software implementation, program code performs specified tasks when executed on a processor (for example, a CPU or CPUs). The program code can be stored in one or more machine-readable memory devices. The features of the techniques described herein are system-independent, meaning that the techniques may be implemented on a variety of computing systems having a variety of processors. For example, implementations may include an entity (for example, software) that causes hardware to perform operations, e.g., processors functional blocks, and so on. For example, a hardware device may include a machine-readable medium that may be configured to maintain instructions that cause the hardware device, including an operating system executed thereon and associated hardware, to perform operations. Thus, the instructions may function to configure an operating system and associated hardware to perform the operations and thereby configure or otherwise adapt a hardware device to perform functions described above. The instructions may be provided by the machine-readable medium through a variety of different configurations to hardware elements that execute the instructions.

In the following, further features, characteristics and advantages of the invention will be described by means of items:

Item 1. A data processing system comprising:

a processor, and a memory storing executable instructions which, when executed by the processor, cause the processor alone or in combination with other processors to perform the following functions:

receive textual user input from a user describing a design to be generated;

implement a first prompt generator to generate a first prompt for a Large Language Model (LLM) to restructure the user input; and implement a second prompt generator to generate a second prompt for a text-to-image model using output of the LLM, the second prompt to prompt the text-to-image model to produce a proposed design based on the user input;

wherein the proposed design is provided to the user via an application comprising controls for further editing the proposed design.

Item 2. The system of Item 1, wherein the first prompt specifies a semantic frame to be populated with values derived from the user input by the LLM.

Item 3. The system of Item 2, further comprising a database of templates for the second prompt, wherein the second prompt generator generates the second prompt by inserting values from the semantic frame to a template from the template database.

Item 4. The system of Item 3, wherein the second prompt generator selects a template from the database at random or based on training for use with the values from the semantic frame.

Item 5. The system of Item 1, the processor further to submit the proposed design and instructions derived from the user input to a text placement model so as to prompt the text placement model to provide a position for text in the proposed design.

Item 6. The system of Item 5, the processor further to call an Optical Character Recognition (OCR) service to check the proposed design for text before submitting the proposed design to the text placement model.

Item 7. The system of Item 6, the processor further to discard the proposed design when text is identified in the proposed design by the OCR service.

Item 8. The system of Item 1, further comprising a server that comprises the processor, memory and prompt generators so as to provide a design suggestion service via a network to a user terminal.

Item 9. A method of providing a design suggestion service based on user input, the method comprising:

receiving textual user input from a user describing a design to be generated;

implementing a first prompt generator to generate a first prompt for a Large Language Model (LLM) to restructure the user input;

implementing a second prompt generator to generate a second prompt for a text-to-image model using output of the LLM to produce, the second prompt to prompt the text-to-image model to produce a proposed design based on the user input; and supporting user production of a desired work by providing the proposed design to a productivity application of the user, application comprising controls for further editing the proposed design.

Item 10. The method of Item 9, further comprising, with the first prompt, specifying a semantic frame of fields to be populated with values derived by the LLM from the user input.

Item 11. The method of Item 10, further comprising a database of templates for the second prompt, wherein the second prompt generator generates the second prompt by inserting values from the semantic frame into fields of a template from the template database.

Item 12. The method of Item 11, wherein the second prompt generator selects a template from the database at random or based on training for use with the values from the semantic frame.

Item 13. The method of Item 9, further comprising submitting the proposed design and instructions derived from the user input to a text placement model so as to prompt the text placement model to provide a position for text in the proposed design.

Item 14. The method of Item 13, further comprising calling an Optical Character Recognition (OCR) service to check the proposed design for text before submitting the proposed design to the text placement model.

Item 15. The method of Item 14, further comprising discarding the proposed design when text is identified in the proposed design by the OCR service.

Item 16. The method of Item 15, further comprising generating a new proposed design after discarding the proposed design in which text was identified.

Item 17. The method of Item 9, further comprising providing the design suggestion service via a network to a user terminal from where the user input is received.

Item 18. The method of Item 9, further comprising providing the design suggestion service with components of the productivity application.

Item 19. A device comprising:

a processor, and a memory storing executable instructions which, when executed by the processor, cause the processor alone or in combination with other processors to perform the following functions:

receive textual user input from a user describing a design to be generated;

implement a first prompt generator to generate a first prompt for a Large Language Model (LLM) to restructure the user input;

implement a second prompt generator to generate a second prompt for a text-to-image model using output of the LLM to produce, the second prompt to prompt the text-to-image model to produce a proposed design based on the user input; and submit the proposed design along with instructions derived from the user input to a text placement model to prompt the text placement model to provide a position for text in the proposed design;

wherein the proposed design with added text is provided to the user via an application comprising controls for further editing the proposed design.

Item 20. The system of Item 19, wherein the text placement model further provides layering and bounding boxes of elements of the proposed design with text to support editing of the proposed design and text.

In the foregoing detailed description, numerous specific details were set forth by way of examples in order to provide a thorough understanding of the relevant teachings. It will be apparent to persons of ordinary skill, upon reading the description, that various aspects can be practiced without such details. In other instances, well known methods, procedures, components, and/or circuitry have been described at a relatively high-level, without detail, in order to avoid unnecessarily obscuring aspects of the present teachings.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows, and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein.

Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element. Furthermore, subsequent limitations referring back to "said element" or "the element" performing certain functions signifies that "said element" or "the element" alone or in combination with additional identical elements in the process, method, article or apparatus are capable of performing all of the recited functions.

The Abstract of the Disclosure is provided to allow the reader to quickly identify the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that any claim requires more features than the claim expressly recites. Rather, as the following claims reflect, inventive subject matter lies in less than all features of a single disclosed example. Thus, the following claims are hereby incorporated into the Detailed Description, with each claim standing on its own as a separately claimed subject matter.

The methods and system described above allow the range of proposed designs a user can generate to be virtually limitless. Design suggestions are no longer a function of the quantity and coverage of assets. The techniques described also allow for leveraging the ongoing development and improvement of text-to-image models especially to generate content that is highly relevant and highly aligned to a user's requested theme. Text-to-image models are good at honoring requested styles and colors, which will help create an intelligent experience where the product understands the stylistic preferences of the user per-prompt. The technique also infers styles that would work well based on the intent of a user prompt and includes these styles in the prompt engineering to offer a better user experience. The system allows for user interaction to customize aspects of the output designs and a way for the system to learn better layouts, choice of various elements such as fonts and styles and prompt templates for image generation over time.

What is claimed is:

1. A data processing system comprising:
   a processor, and
   a memory storing executable instructions which, when executed by the processor, cause the processor alone or in combination with other processors to perform operations of:
      receive textual user input from a user, the textual user input including a natural language user description of a design to be generated;
      generate, by a first prompt generator, a first prompt for a Large Language Model (LLM) by structuring the first prompt that specifies the LLM to extract values from the natural language user description for a set of fields in a semantic frame;
      generate, by a second prompt generator, a second prompt for a text-to-image model by inserting the values from the semantic frame into a template selected, at random or based on training, from a template database, wherein the second prompt specifies the text-to-image model to produce a proposed design based on the selected template; and
      provide the proposed design to the user via an application comprising controls for further editing the proposed design.

2. The system of claim 1, wherein the LLM comprises a generative pre-trained transformer (GPT) model.

3. The system of claim 1, wherein the text-to-image model comprises a DALL-E model or a Stable Diffusion model.

4. The system of claim 1, the processor further to submit the proposed design and instructions derived from the textual user input to a text placement model so as to prompt the text placement model to provide a position for text in the proposed design.

5. The system of claim 4, the processor further to call an Optical Character Recognition (OCR) service to check the proposed design for the text before submitting the proposed design to the text placement model.

6. The system of claim 5, the processor further to discard the proposed design when the text is identified in the proposed design by the OCR service.

7. The system of claim 1, further comprising a server that comprises the processor, the memory, the first prompt generator, and the second prompt generator to provide a design suggestion service via a network to a user terminal.

8. A method of providing a design suggestion service based on user input, the method comprising:
   receiving textual user input from a user, the textual user input including a natural language user description of a design to be generated;
   generating, by a first prompt generator, a first prompt for a Large Language Model (LLM) by structuring the first prompt that specifies the LLM to extract values from the natural language user description for a set of fields in a semantic frame;

generating, by a second prompt generator, a second prompt for a text-to-image model by inserting the values from the semantic frame into a template selected, at random or based on training, from a template database, wherein the second prompt specifies the text-to-image model to produce a proposed design based on the user input; and
providing the proposed design to a productivity application of the user, the productivity application comprising controls for further editing the proposed design.

9. The method of claim 8, wherein the LLM comprises a generative pre-trained transformer (GPT) model.

10. The method of claim 8, wherein the text-to-image model comprises a DALL-E model or a Stable Diffusion model.

11. The method of claim 8, further comprising submitting the proposed design and instructions derived from the user input to a text placement model so as to prompt the text placement model to provide a position for text in the proposed design.

12. The method of claim 11, further comprising calling an Optical Character Recognition (OCR) service to check the proposed design for the text before submitting the proposed design to the text placement model.

13. The method of claim 12, further comprising discarding the proposed design when the text is identified in the proposed design by the OCR service.

14. The method of claim 13, further comprising generating a new proposed design after discarding the proposed design in which the text was identified.

15. The method of claim 8, further comprising providing the design suggestion service via a network to a user terminal from where the user input is received.

16. The method of claim 8, further comprising providing the design suggestion service with components of the productivity application.

17. A device comprising:
   a processor, and
   a memory storing executable instructions which, when executed by the processor, cause the processor alone or in combination with other processors to perform functions of:
      receive textual user input from a user describing a design to be generated;
      generate, by a first prompt generator, a first prompt for a Large Language Model (LLM) by structuring the first prompt that specifies the LLM to extract values from a natural language user description for a set of fields in a semantic frame;
      generate, by a second prompt generator, a second prompt for a text-to-image model by inserting the values from the semantic frame into a template selected, at random or based on training, from a template database, wherein the second prompt specifies the text-to-image model to produce a proposed design based on the selected template;
      submit the proposed design along with instructions derived from the textual user input to a text placement model to prompt the text placement model to provide a position for text in the proposed design; and
      provide the proposed design with the text to the user via an application comprising controls for further editing the proposed design.

18. The device of claim 17, wherein the text placement model further provides layering and bounding boxes of elements of the proposed design with the text to support editing of the proposed design and the text.

\* \* \* \* \*